United States Patent [19]

Crean et al.

[11] 4,366,508
[45] Dec. 28, 1982

[54] IMAGE MAGNIFICATION AND DEMAGNIFICATION SYSTEM

[75] Inventors: Peter A. Crean, Penfield, N.Y.; Martin A. Agulnek, Sharon, Mass.

[73] Assignee: Xerox Corporation, Stamford, Conn.

[21] Appl. No.: 128,018

[22] Filed: Mar. 7, 1980

[51] Int. Cl.³ ............................................. H04N 1/04
[52] U.S. Cl. ..................................... 358/287; 332/19; 358/77
[58] Field of Search ................... 358/287, 77; 332/19; 331/1 A, 117

[56] References Cited

U.S. PATENT DOCUMENTS

| | | | |
|---|---|---|---|
| 3,541,245 | 11/1970 | Wilby | 358/287 |
| 3,582,549 | 6/1971 | Hell et al. | 358/287 |
| 4,017,719 | 9/1977 | Kaplan et al. | 328/15 |
| 4,027,274 | 5/1977 | Fukui et al. | 332/19 |
| 4,066,978 | 1/1978 | Cox, Jr. et al. | 331/1 A |
| 4,113,378 | 9/1978 | Wirtz | 355/55 |
| 4,169,275 | 9/1979 | Gunning | 358/300 |

*Primary Examiner*—Jin F. Ng
*Assistant Examiner*—Edward Lacey Coles, Sr.
*Attorney, Agent, or Firm*—Frederick E. McMullen

[57] ABSTRACT

A control system for controlling the size of the image produced by pixels generated by a raster scanner employing a binary rate multiplier for image size control along the X-axis, the multiplier being programmed to the size image desired to vary the frequency of the pixel clock signals output by the multiplier, together with a control flip-flop astride the image pixel stream and driven by the multiplier clock signals to speed up or reduce the rate at which image pixels are output. For image size control along the Y-axis, a phase lock loop is provided for controlling scanning carriage speed in response to the frequency of the signals output by a programmable frequency generator.

7 Claims, 5 Drawing Figures

INPUT/OUTPUT OF A TWO STAGE BRM

IMAGE MAGNIFICATION AND DEMAGNIFICATION SYSTEM

This invention relates to an image magnification/demagnification system, and more particularly to an apparatus and method for producing images of preselected size.

Image reading devices such as raster scanners permit a large variety of so called image processing functions to be accomplished on the image between the time the original image is first scanned and the time the output image or copy is produced. One particularly useful function is continuous minification or reduction and magnification or enlargement of the image. In the copier arts especially, reduction of images is quite useful for document merging, two-up configurations, faster digital rotation, and the like. Magnification is also useful as it permits composition, filling a page with a document, etc.

The invention relates to an apparatus for producing image pixels at a preset clock rate representative of an original image comprising, in combination: movable scanning means for scanning the original image line-by-line; a pixel control gate through which the image pixels are output; clock means for generating control clock pulses, the control clock pulses being output to the control gate; and control means for selectively varying the size of the output image derived from the image pixels including first means for controlling the frequency of the control clock pulses output by the clock means whereby to vary the rate at which image pixels are output by the control gate and therefore, the size of the output image along a first dimension, and second means for controlling the speed of the scanning means whereby to vary the rate at which lines of image pixels are produced and the size of the output image along a second dimension substantially perpendicular to the first dimension.

The invention further relates to a method of processing a stream of image pixels to vary the size of the image created by the pixels, the steps consisting of: inputting the stream of image pixels at a preset clock rate; providing a stream of output clock pulses for continuing clocking of at least some of the pixels in the image pixel stream; removing discrete ones of the clock pulses from the stream of output clock pulses in accordance with the image size selected to provide a modified stream of output clock pulses; and outputting discrete ones of the pixels while barring output of other pixels in the image pixel stream in conformance with the modified stream of output clock pulses to provide the selected image size.

Figure 1:
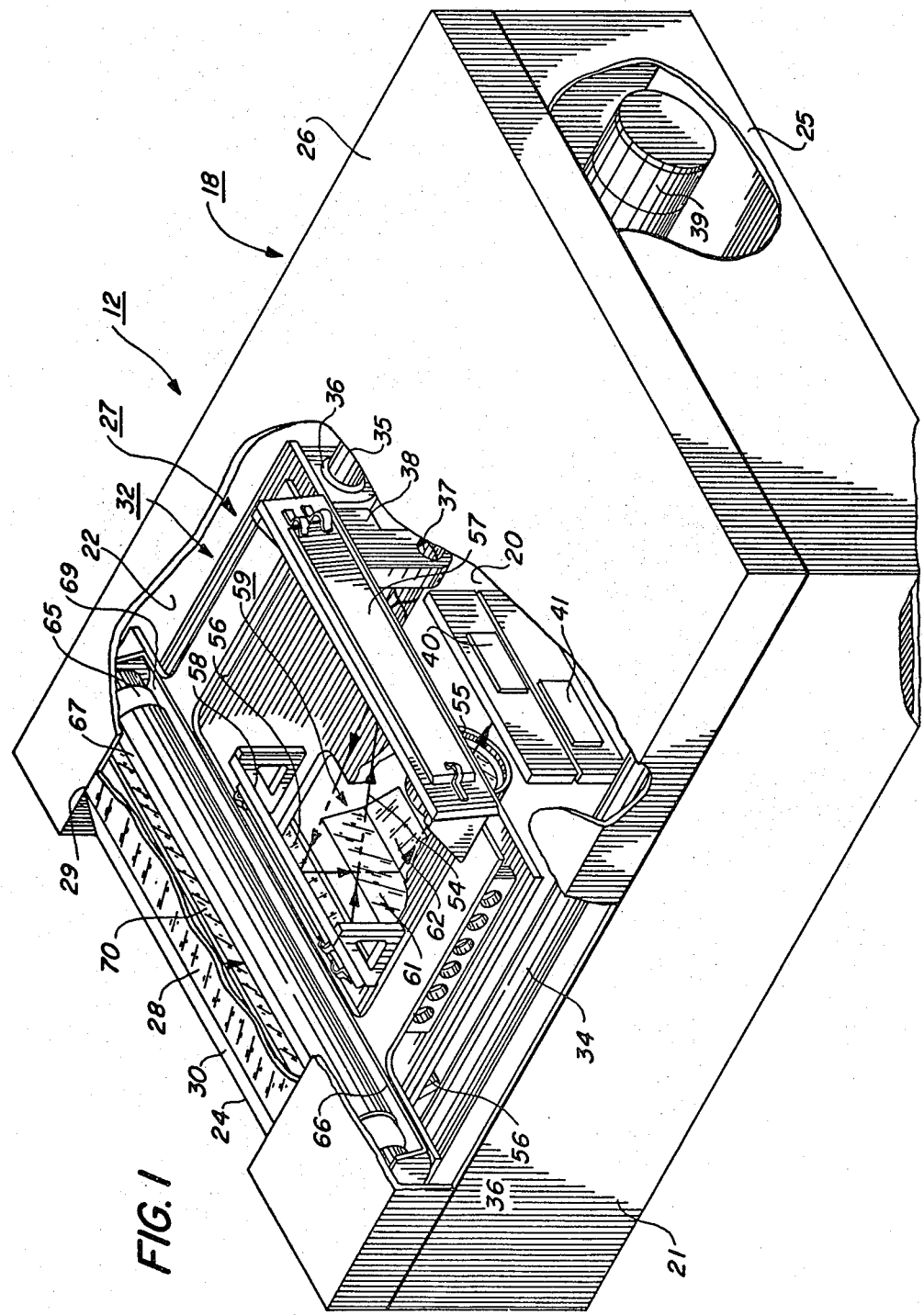
FIG. 1 is an isometric view of an exemplary raster input scanner of the type usable with the image size control of the present invention.
Figure 2:
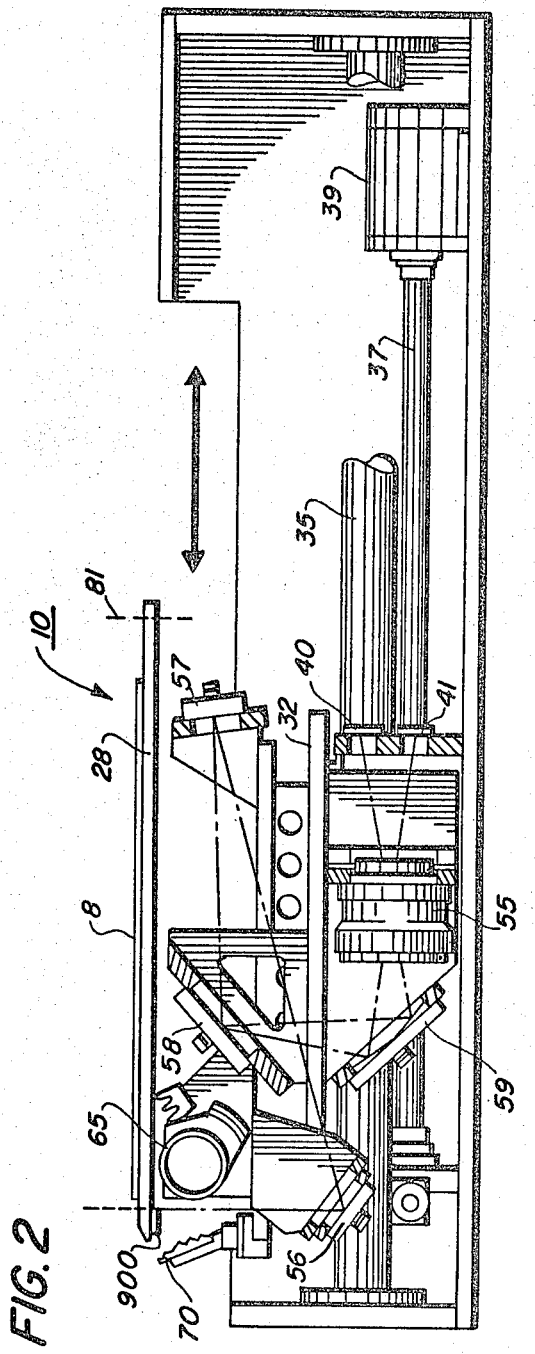
FIG. 2 is a side view in cross section of the scanner shown in FIG. 1.

Referring particularly to FIGS. 1 and 2, an exemplary raster scanner 12 is thereshown. Scanner 12 includes a frame or housing 18, having base 20, sides 21,22, end walls 24,25, and top wall 26 cooperating to form an interior chamber or compartment 27, within which a movable scanning carriage 32 is disposed. Top wall 26 includes a generally rectangular transparent glass or platen 28 through which an original document 8 to be scanned is viewed.

For scanning, the document 8 is placed on platen 28 in registered position. Following completion of scanning, the document is manually removed. While manual placement and removal of the document original onto and off of platen 28 is described and shown herein, an automatic device or document handler may instead, be envisioned.

Scan carriage 32 is supported for longitudinal movement (in the Y direction) within compartment 28 of scanner 12 on parallel carriage support rods 34,35. Carriage support rods 34,35 are carried in front and rear end walls 24,25 of housing 18. To support carriage 32 on rods 34,35, front and rear journals or bearings 36 are provided on the sides of carriage 32, bearings 36 slidably riding on rods 34,35.

To impart scanning motion to carriage 32, a drive screw 37 is threadedly engaged with carriage 32 via nut 38. Reversible drive motor 39, which is supported on base 20 of housing 18 adjacent rear end wall 25, drives screw 37 in either a clockwise (scan) or counter clockwise (return) direction to move carriage 32 longitudinally along carriage support rods 34,35.

A pair of scanning or image arrays 40,41, which may for example, comprise Fairchild Model 121 H CCD Chips, are supported on carriage 32 adjacent one end thereof in predetermined spaced relation such that array 40 is above and to one side of array 41. Arrays 40,41 each comprise a series (i.e. 1728) of individual photosensitive elements effective when exposed to the document being scanned to generate a signal whose potential is proportional to the reflectance of the image area seen by the array element.

An optical system consisting of lens 55, scan mirror 56, and reflecting mirrors 57,58,59, cooperate to form an optical path 54 through which image rays reflected from a document on platen 28 are transmitted to arrays 40,41. Lens 55 is mounted substantially centrally on carriage 32 in preset spaced opposing relation to arrays 40,41. Mirrors 56,57,58,59, which are generally rectangular in configuration, are mounted on carriage 32 in preselected angular dispositions to provide a folded optical path between platen 28 and lens 55. Mirror 59 has two facets 61,62 disposed at predetermined angles with respect to one another such that mirror 59 serves as an object beam splitter to split the projected image into two images, one for each array 40,41. During scanning, image rays reflected from the document on platen 28 pass downwardly to scan mirror 56 and from scan mirror 56 through mirrors 57,58,59 to lens 55 and arrays 40,41.

To illuminate platen 28 and any document thereon, an elongated exposure lamp 65 is provided on carriage 32. Lamp 65 which extends in the direction generally perpendicular to the direction of movement of scan carriage 32, is disposed in a generally cylindrical lamp housing 66. A slit-like exposure aperture 67 in lamp housing 66 extends across the width of platen 28. The interior walls 69 of lamp housing 66 are preferably polished to reflect light from lamp 65 toward aperture 67 and platen 28. Reflector 70, opposite aperture 67, reflects light emitted by lamp 65 onto platen 28 adjacent the image scan line.

During operation, lens 55 and mirrors 56,57,58,59, and exposure lamp 65 and reflector 70, move (in the Y direction shown by the solid line arrow of FIGS. 2 and 3) from the carriage home position 80 to the end of scan (EOS) 81 to scan the document 8 on platen 28. Light from exposure lamp 65 illuminates a line-like area i.e. the scan line, which extends across the width of platen 28 in the X direction. As carriage 32 moves under platen 28, the line-like illuminated area travels the length of platen 28. Following completion of the scan, carriage 32 returns to the home position.

Figure 3:
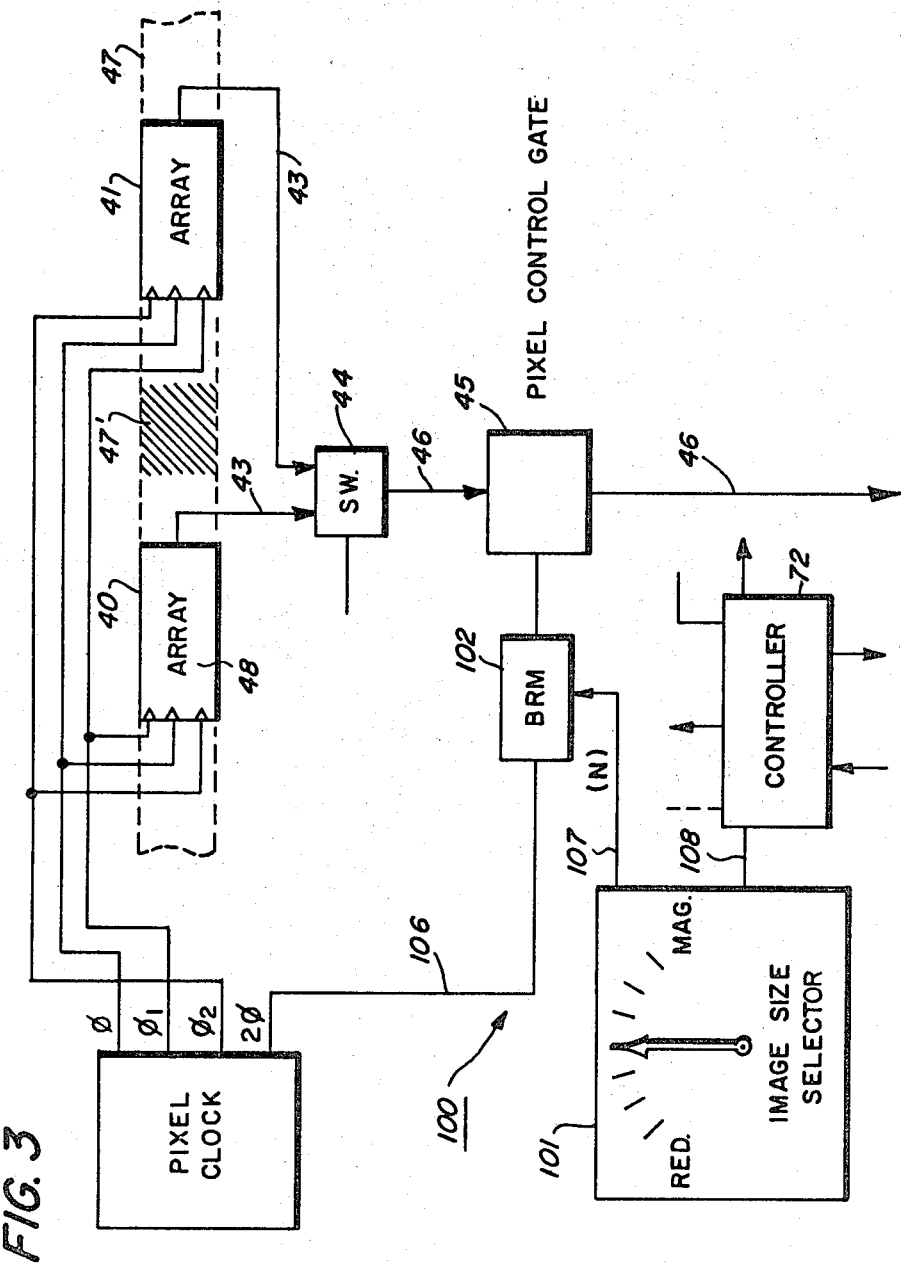
FIG. 3 is a schematic view illustrating the image size control system of the present invention.

Referring to FIG. 3, scanning arrays 40,41 each include a succession (i.e. array) of photosensitive elements on the narrow center portion of silicon chip 48. Arrays 40,41 function to convert the graphical image of a document 8 to a series of electronic image signals or pixels. On exposure of the photosensitive elements to the illuminated document over a preset time interval (termed the "integration" period), a charge proportional to the luminous energy reflected from the document is generated. Following integration, the charges on the photosensitive elements are transferred to an internal shift register pair. Thereafter, the image pixels are shifted by means of clock driving pulses $\phi 1$, $\phi 2$ serially along the shift register pair and output via leads 43 to crossover switch 44. From crossover switch 44, the signals are fed to pixel output lead 46. A suitable pixel clock 42 provides pixel clock pulses $\phi$, $\phi 1$, $\phi 2$, and $2\phi$.

Arrays 40,41 are arranged so that the array viewing fields 47 overlap one another (at 47') to assure an uninterrupted scan. Crossover from one array (i.e. 40) to another (i.e. 41) is made within the array overlapping viewing fields, with crossover switch 44 being actuated by suitable means (not shown) following a predetermined pixel count to switch pixel output lead 46 from one array (i.e. array 40) to the other (i.e. array 41). Unused or leftover image pixels from both arrays 40,41 are discarded.

To permit the size of the output image to be controlled in the X-direction, a pixel control gate 45 which may, for example comprise a flip-flop, is provided in series with pixel output lead 46.

An image size control 100 is provided, having a suitable Image Size Selector 101 for use by the operator or user in selecting the image size desired. Normally, Image Size Selector 101 would be incorporated into and made part of the control console or panel (not shown) of scanner 12.

A binary rate multiplier (BRM herein) 102, which may comprise a Texas Instruments Model 7497 BRM, controls image size in the X-direction. BRM 102 incorporates a programmable multiplier enabling a selected output frequency that is a fraction of the input frequency, to be obtained, depending upon the binary multiplier value N applied. To produce the output frequency selected, BRM 102 drops selective clock cycles from the input clock frequency.

For changes in image size along the X-axis, a nearest neighbor algorithm is applied. By applying an input clock signal with frequency f to a BRM, the output clock frequency Fo is given by the equation:

$$fo = (M \cdot f / 64)$$

where $0 < M < 63$ i.e. 6 bits binary coded.

If two devices are cascaded, the output frequency is then:

$$fo = \frac{M_1 \cdot f}{64} + \frac{M_2 \cdot f}{4096}$$

Figure 4:
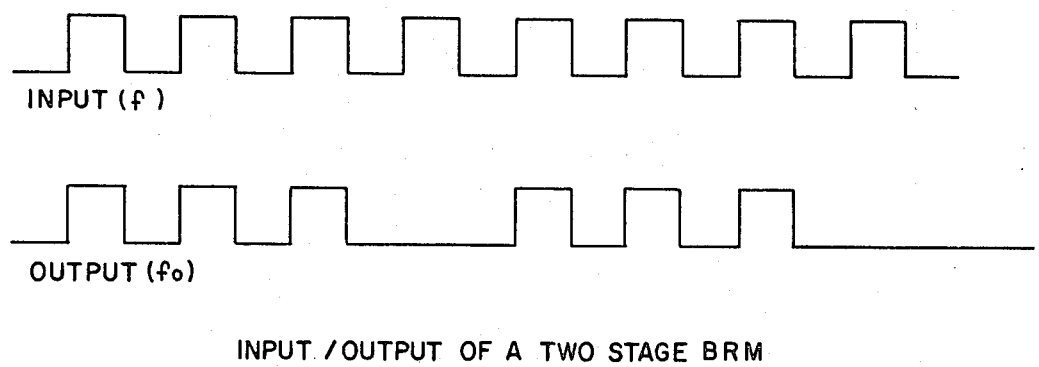
FIG. 4 is a timing graph of an operating example of the binary rate multiplier used in the present invention.

To realize the output clock frequency Fo, selected clock cycles of the input clock f are dropped in a manner identical to the nearest neighbor algorithm. FIG. 4 illustrates an exemplary relationship between input and outpt clocks for an $M_1 = 48$ and $M_2 = 0$. This results in an output clock frequency of fo = 0.75fo.

Clock pulses ($2\phi$) at a frequency 2 times the frequency f of the pixel clock pulses $\phi$ are input to BRM 102 through clock input lead 106 from pixel clock 42. Control lead 107 inputs the multiplier value N to BRM 102 in accordance with the image size selected by the user or operator.

Changes in image size along the X-axis are effected by either speeding up or slowing down the frequency (f) of the clock rate ($\phi$) at which image pixels are clocked through pixel output lead 46. The former expands the size of the image while the latter reduces the image size, the degree of which is dependent upon the amount by which the frequency (f) of the pixel clock pulses is changed.

As described, BRM 102 functions to selectively reduce the frequency of the clock signals $2\phi$ input thereto in accordance with the multiplier value N input thereto by Image Size Selector 101. Where no change in image size is desired, a multiplier value of 32 is output by Image Size Selector 101 to BRM 102. Accordingly, the frequency of the control pulses output by BRM 102 to Pixel Control Gate 45 is one-half the frequency of the input clock signal $2\phi$ to BRM 102. As a result, the frequency of the control pulses to gate 45 match that of pixel clock $\phi$. Pixels are therefore output from Pixel Control Gate 45 at the same clock rate ($\phi$) as the pixels are input and hence no change in image size along the X-axis occurs.

Where an enlarged image (in the X-direction) is selected, the multiplier value N input to BRM 102 increases the frequency of the control pulses output by BRM 102 to control gate 45 to a frequency greater than the frequency of the pixel clock pulses $\phi$. As a result, the rate at which image pixels are output from Pixel Control Gate 45 is increased, enlarging the image along the X-axis.

It will be understood that maximum image magnification may be increased by increasing the frequency of the input clock signal from pixel clock 42 to BRM 102.

Where a reduced size image is desired, the multiplier value N output by Image Size Selector 101 reduces the frequency of the control pulses output by BRM 102 to control gate 45 to a frequency less than the frequency of the pixel clock pulses $\phi$. As a result, the rate at which image pixels are output from control gate 45 is reduced, reducing the image along the X-axis.

Changes in image size along the Y-axis are effected by either speeding up or slowing down the scan speed of scanning carriage 32. Increasing the scan speed of carriage 32 reduces the image size while decreasing the carriage scan speed increases image size.

Figure 5:
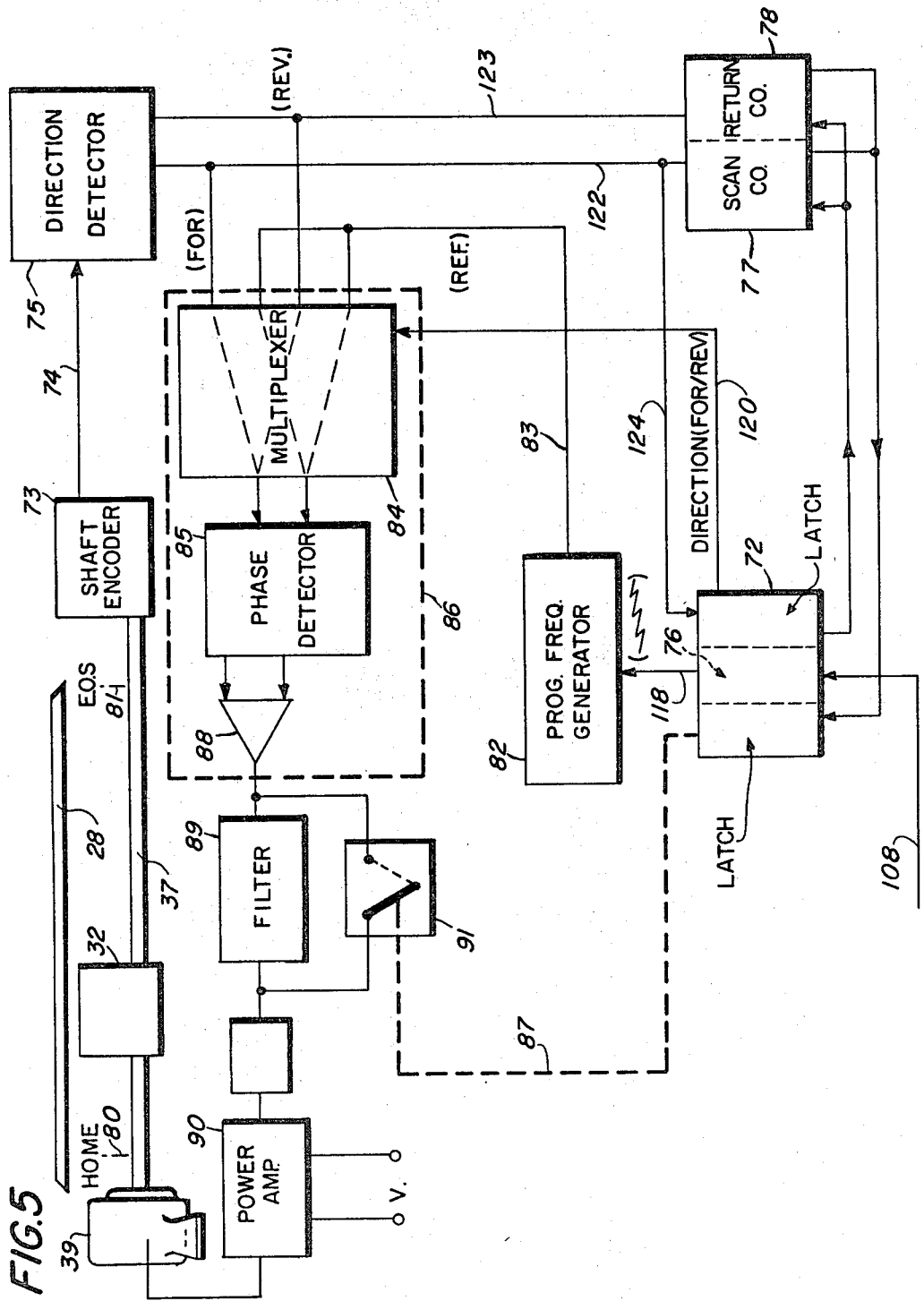
FIG. 5 is a block diagram showing the scan carriage speed control for the scanner shown in FIG. 1.

Referring particularly to FIG. 5, control over scanning carriage 32 of scanner 12 is exercised by a suitable controller 72 in accordance with the magnification selected by the user or operator through Image Size Selector 101. A Shaft Encoder 73 is provided on the output shaft (drive screw 37) of scanning carriage drive motor 39. Encoder 73 serves to generate quadrature (i.e. 90° out of phase) signals in lead 74 in response to rotation of motor 39 in either a forward or reverse direction. A Direction Detector 75 determines from the phase relationship of the signals output by encoder 73 the direction of rotation of motor 39 and hence the direction of movement of scanning carriage 32, and outputs either forward (FOR) or reverse (REV) control pulses via leads 122,123 to forward (SCAN) and reverse (RETURN) position counters 77,78 respectively in response thereto.

Forward (SCAN) and reverse (RETURN) position counters 77,78 are preset to a maximum count representing the home position 80 of scanning carriage 32. As carriage 32 moves forward (i.e. SCANS) from the home position, counter 77 is decremented by signal pulses outpt by encoder 73. On reverse (i.e. RETURN) movement of carriage 32, counter 78 is decremented.

To determine carriage home position and set counters 77, 78, motor 39 may be initially energized in the reverse (REV) direction to drive scanning carriage 32 in the reverse (i.e. RETURN) direction until the carriage is brought into abutment with a carriage stop or bumper (not shown). Counters 77, 78 may then be zeroed and set to the predetermined maximum count.

As will be understood, the instantaneous count on counters 77, 78 reflects the position of carriage 32 along the scan path. The carriage position may be determined at any point during scan by subtracting the count on forward counter 77 from the count on reverse counter 78.

A Programmable Frequency Generator 82 provides a frequency signal (REF) which is input via lead 83 and Multiplexer 84 to Phase Detector 85 of phase lock loop control 86 for phase locked motor operation. Multiplexer 84 is controlled by direction signals (DIRECTION) from direction detector 75 through lead 124, controller 72 which serves to latch the direction signal, and lead 124. Multiplexer 84, during scan, couples the forward (FOR) lead 122 of Direction Detector 75, together with the output lead 82 (REF) of Frequency Generator 82 to Phase Detector 85, and during carriage return, couples the reverse (REV) lead 123 of Direction Detector 75, together with lead 83 (REF) to Phase Detector 85. Lead 124 couples the forward lead 122 of Direction Detector 75 to Controller 72. Phase Detector 85 compares the frequencies of the forward (FOR) and reverse (REV) signal output of Direction Detector 75 with the frequency of the reference signal (REF) output of frequency generator 82. The frequency of the reference signal (REF) output by generator 82 is set by a stepped signal output in lead 111 of Controller 72. For this purpose, Controller 72 has suitable logic circuitry 76 for generating a stepped output wave as for example as conventional programmable counter feeding a conventional digital-to-analog (D/A) converter. There, as will be understood by those skilled in the art, the instantaneous counts at the counter output are converted to analog signals by the D/A converter with the result that a stepped signal appears at the D/A converter output. Adjusting the count on the counter via a signal in lead 108 from image size selector 101 changes the counter count and accordingly the stepped waveform as will be readily understood.

Control over scan carriage motor 39 is exercised through phase locked loop section 86, the output of Phase Detector 85 thereof being input to Adder 88 which sums the output of Phase Detector 85 in accordance with a predetermined formula. The signal output of Adder 88 is input via loop Filter 89 to Power Amplifier 90 controlling power input to motor 39. Filter 89 preferably comprises a low pass filter with predetermined gain (i,e, 2.5), filter 89 being tuned to roll off at 100 cycles to filter out transients.

In operation, the signal (DIRECTION FOR-REV) in lead 120 sets Multiplexer 84 in accordance with the direction in which scan carriage 32 is to move, i.e., in the forward (SCAN) direction or reverse (RETURN) direction. Controller logic circuitry 76 loads upwardly stepped signals through lead 118, into Frequency Generator 82. Generator 82 responds by outputting to Phase Detector 85 through lead 83 reference signals (REF) at frequencies which increases in steps. For startup purposes, the initial reference signal frequency is relatively low (i.e. 1 K.c.) with subsequent reference signals increasing in steps. As scanning carriage 32 approaches the operating speed required for the magnification selected, the step size of the step signal output by controller logic circuitry 76 is progressively reduced to decrease the frequency steps from relatively large (coarse) steps to relatively small (fine) steps.

Phase Detector 85 compares the frequency of the reference signal (REF) from Frequency Generator 82 with the frequency of the signal representing the speed at which scan carriage 32 is moving as output by Shaft Encoder 73. Where a difference exists, an error signal is generated. The error signal is input through Filter 89 to Power Amplifier 90 to energize carriage drive motor 39. Motor 39 accelerates carriage 32 in the desired direction. The increase in the speed of carriage 32 in turn increases the frequency of the signal output by Shaft Encoder 73 until the frequency of the reference signal (REF) and the frequency of the signal from Shaft Encoder 73 match, at which point the error signal output by Phase Detector 85 falls to zero, interrupting power to motor 39.

The above procedure is repeated periodically (i.e. in intervals of 0.001 seconds) until scan carriage 32 reaches the required operating speed. Thus, as scan carriage 32 accelerates, the step signal from controller logic circuitry 76 periodically resets Frequency Generator 82 to change the frequency of the signal output by generator 82. Phase lock loop 86 responds to energize carriage drive motor 39 and accelerate carriage 32 until the carriage has been stopped through the speed plateaus represented by each successive reference signal to the final predetermined carriage speed.

The final carriage speed in the scan direction is dependent upon the image size selected as represented by the signal input to controller 72 from Image Size Selector 101. The return speed of scan carriage 32 is preferably preset for an optimum scanning carriage return speed.

With scan carriage 32 at desired operating speed, and the frequency of the reference signal output by Frequency Generator 82 constant, phase lock loop 86 serves to maintain carriage 32 at the desired operating speed. Should scan carriage 32 slow, Phase Detector 85 detects the change in frequency between the signal output of Shaft Encoder 73 and the reference signal output by generator 82 and generates an error signal energizing motor 39.

As scan carriage 32 approaches the End of Scan (EOS), the count on scan counters 77,78 reaches a preset count representing the end of scan (EOS). At that point, a signal from scan counters 77,78 is output to Controller 72 where the signal is latched by suitable means such as a flip-flop. The latched signal is output via lead 87 to switch 91 to close switch 91 and short out Filter 89, thereby providing a gain of zero. With gain set to zero, power to carriage motor 39 is interrupted, stopping scan carriage 32.

Phase Detector 85 may comprise a Motorola MC 4044 Phase Frequency Comparator which generates an output proportional to the phase or frequency difference between the encoder signal and the reference signal (REF) input by generator 82, while Shaft Encoder 73 may comprise a Model 992-500 OCLP manufactured by Disc Instruments. Counters 77,78 may comprise Intel 8253 16 bit down counters while Adder 88 may comprise a 741 Differential Amplifier. Programmable Frequency Generator 82 preferably consists of a crystal clock and programmable counters.

While the invention has been described with reference to the structure disclosed, it is not confined to the details set forth, but is intended to cover such modifications or changes as may come within the scope of the following claims.

We claim:

1. In an apparatus for producing image pixels representative of an original image for use in making an output image of selected size, said image pixels being produced at a preset clock rate, said apparatus including scanning means movable at a speed for scanning said original image line-by-line, the combination of:
   (a) a pixel control gate through which said image pixels are output;
   (b) independent clock means for generating control clock pulses at a frequency, said control clock pulses being output to said control gate; and
   (c) control means for selectively varying the size of the output image derived from said image pixels, said control means including:
      (1) first means for independently controlling the frequency of said control clock pulses output by said clock means whereby to vary the rate at which said image pixels are output by said control gate and independently vary the size of said output image along a first dimension; and
      (2) second means for independently controlling the speed of said scanning means whereby to vary the rate at which said lines of image pixels are produced and independently vary the size of said output image along a second dimension,
   said second dimension being substantially perpendicular to said first dimension.

2. The apparatus according to claim 1 in which the frequency of said control clock pulses output by said clock means is greater than said preset pixel clock rate whereby to permit the size of said output image to be enlarged or reduced selectively.

3. The apparatus according to claim 1 in which the frequency of said control clock pulses output by said clock means is at least twice the frequency of said preset pixel clock rate whereby to permit the size of said output image to be at least doubled in size.

4. The apparatus according to claim 1 in which said scanning means includes:
   a movable scan carriage,
   at least one scanning array on said carriage for scanning said original image, and
   drive means for driving said scan carriage to enable said array to scan said original image;
   said second means including:
   a programmable frequency generator settable to said output image selected size, and
   phase lock loop means for controlling the speed of said drive means in response to the frequency output of said generator whereby to drive said scan carriage at a scanning speed corresponding to said output image selected size.

5. The method of processing a stream of image pixels representing an image of a preset size to provide an image output of selected size from said pixels, comprising the steps of:
   (a) generating said image pixels by raster scanning an original at a preset speed with at least one movable scanning array;
   (b) outputting said image pixels at a preset pixel clock rate;
   (c) generating pixel output clock pulses at a predetermined frequency for clocking said image pixels to provide said image output;
   (d) independently adjusting the frequency of said pixel clock output clock pulses to select the size of said image output provided by said image pixels along one axis,
   (e) independently changing said preset speed at which said original is scanned to select the size of the image output provided along a second axis perpendicular to said one axis; and
   (f) outputting image pixels derived by scanning said original at the preset speed selected and at the adjusted pixel output clock frequency to provide an image output of said selected size.

6. The method according to claim 5 including the step of generating said pixel output clock pulses at a frequency greater than the frequency of said pixel input clock rate.

7. The method according to claim 5 including the steps of generating said pixel output clock pulses at a frequency at least twice the frequency of said pixel input clock rate.

* * * * *